United States Patent

[11] 3,550,893

| [72] | Inventor | Abe Waitzkin, Cambridge, Mass.<br>3 Garvey St., Everett, Mass. 02149 |
|---|---|---|
| [21] | Appl. No. | 769,842 |
| [22] | Filed | Oct. 23, 1968 |
| [45] | Patented | Dec. 29, 1970 |

[54] REEL HOLDER
5 Claims, 3 Drawing Figs.

[52] U.S. Cl. .................................................. 248/309,
24/265
[51] Int. Cl. .................................................. A47f 5/00
[50] Field of Search .......................................... 248/309,
187, 223; 24/223, 265.2, 230, 230BC, 230SL,
230NP, 201, 201.1, 201S; 16/176

[56] References Cited
UNITED STATES PATENTS

| 1,689,044 | 10/1928 | Meyer | 24/265.2 |
| 2,186,789 | 1/1940 | Rosenberg | 24/265.2 |
| 2,452,145 | 10/1948 | Pike | 24/265.2 |
| 2,608,420 | 8/1952 | Eck | 24/265.2 |
| 2,740,180 | 4/1956 | Nobles | 24/265.2 |

FOREIGN PATENTS

| 817,184 | 5/1937 | France | 16/176 |
| 1,053,245 | 9/1953 | France | 24/265.2 |

*Primary Examiner* — Marion Parsons, Jr.
*Attorney* — Wolf, Greenfield & Hieken

ABSTRACT: A holder for securing a variety of fish reels to the cabin roof of a boat. The holder comprises a cylindrical metal member flattened along one longitudinal portion. Longitudinally extending pins project from each end of the cylindrical member. One of the pins is fixed to the cylindrical member. The other pin is secured for longitudinal movement with respect to the cylindrical member and is spring-tensioned outwardly thereof.

PATENTED DEC 29 1970

3,550,893

INVENTOR.
Abe Waitzkin
BY
Wolf, Greenfield & Sacks

REEL HOLDER

SUBJECT MATTER OF THE INVENTION

The present invention relates to a holder for securing fish reels to the cabin roof of a sport fishing boat.

BACKGROUND OF THE INVENTION

Sport fishing boats ordinarily carry a variety of fishing rigs. Storage of these rigs has been a problem because some of these rigs, for example, tuna fishing rigs, are quite large and heavy. Tuna rigs weighing in the order of 75 pounds with a reel diameter in the order of a foot are not uncommon. For the most part these rigs are secured to the under surface of the cabin roof to keep them out of the way. Heretofore comparatively expensive brackets which are also bulky in size have been used for such purposes.

SUMMARY OF THE INVENTION

It is therefore an object of the present invention to provide an improved holder for securing a variety of different sized reels to the roof of a sport fishing boat, or if desired, against other flat surfaces. A further object of this invention is to provide a comparatively compact inexpensive holder for fishing reels which is adapted for use with reels of different sizes. A still further object of this invention is to provide an improved holder for sport fishing reels which may be secured to rings integrally formed on the reel itself. One further object of the invention is to provide an improved reel holder which is simple to use and is not likely to become defective and which is easy to install and maintain.

In this invention there is provided a cylindrical member having means for securing the member to a suitable support, as for example the roof of a sport fisherman cabin. A fixed pin extends from one end of the cylindrical member. Another pin is secured to the other end of the cylindrical member for axial movement relative thereto. Spring means are provided which exert an outward force upon the second mentioned pin. Preferably a stop means is provided for securing the moveable pin in an inward position.

DESCRIPTION OF THE DRAWINGS

These and other advantages of the present invention will be more clearly understood when considered in connection with the accompanying drawings in which.

DETAILED DESCRIPTION OF PREFERRED EMBODIMENT

Figure 1:
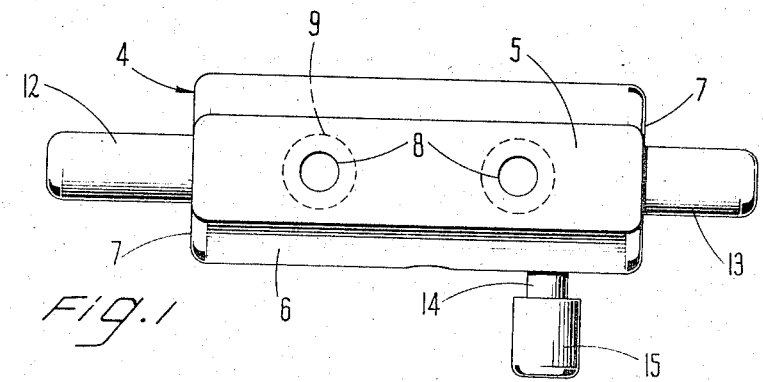
FIG. 1 is a top view of a preferred embodiment of the holder.
Figure 2:
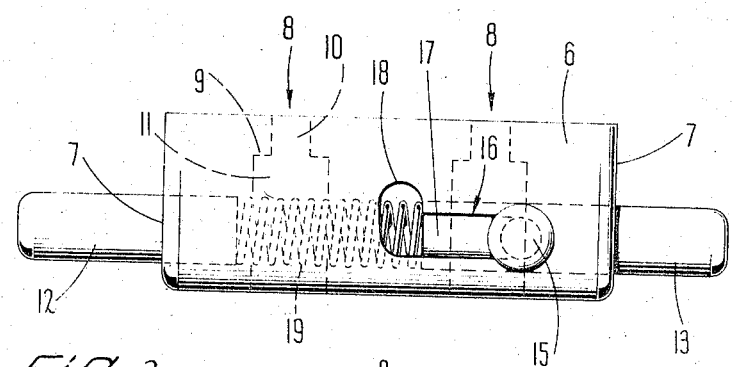
FIG. 2 is a side elevation of the holder of FIG. 1.
Figure 3:
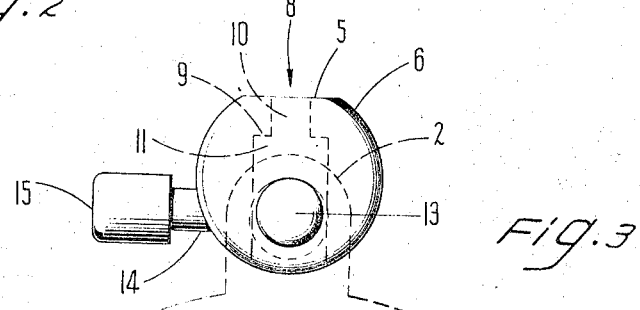
FIG. 3 is an end elevational view of the holder of FIG. 1 with a fishing reel shown in partial dotted outline.

The present invention is ordinarily used in a set of several holders which are secured to the underside of a sport fishing boat cabin, with the holders spaced in parallel relation to secure a plurality of rigs. Each of these holders may be similar in construction to the one shown in the drawings. The holder 1 is designed to secure a range of different sized sport fishing reels of the type that are provided with eyelets 2 on the reel 3. These eyelets 2 are arranged in pairs with aligned openings and project from opposite sides of the reel.

The reel holder has a cylindrical member 4 that preferably has a longitudinal surface comprising an elongated flat surface portion 5 and an arcuate portion 6 contiguous with the flattened portion. The arcuate portion 6 preferably extends over an arc at least 270°. The ends of the cylindrical member 4 may be beveled as illustrated at 7. The cylindrical member 4 is secured to the roof of the cabin by screws or bolts (not shown) that project upwardly through parallel holes 8 which extend through the cylindrical member transverse of its axis with one end of each hole 8 extending through the flattened or flat surface portion 5. These holes have shoulders 9 intermediate their ends defining a narrower section 10, adjacent the flat surface portion 5, then the section 11, remote from the flat surface portion 5. The shoulders 9 receive the head of the screw within the cylindrical member 4 in a manner so as not to interfere with the components hereafter described.

A hole intersecting sections 11, extends longitudinally of the cylindrical member 4 parallel to its longitudinal axis but preferably more remote from the flat surface portion 5. Two pins 12 and 13 are positioned in this hole. One pin 12 is secured permanently against movement at one end of the cylindrical member 4 with the pin projecting substantially beyond the end. The other pin 13 is positioned for axial movement between a position at least substantially retracted within the hole to a position projecting substantially outwardly of the hole at the other end of the cylindrical member from which pin 12 projects. The pins 12 and 13 have a diameter sufficient to support a heavy fishing rig of the type described but small enough to project through the hole of the reel eyelets 2.

The pin 13 is secured against falling out of the cylindrical member 4 by a lever arm 14 which is also used to control its movement. Lever arm 14 which may be provided with an enlarged external handle or knob 15, is secured at its other end to the pin 13 within cylindrical member 4. The lever arm 14 is removably secured to the pin 13 so as to permit removal of pin 1 from the cylindrical member 4 when the member 4 is being secured to a cabin roof when it is necessary to insert screws into openings 8. Conventionally this may be done by threading the end of lever arm 14 and correspondingly tapping a threaded hole in the pin 13 in which lever arm 14 is secured.

The lever arm 14 projects through a J-shaped slot 16 in the cylindrical member 4. The J-shaped slot has a longitudinal section 17 and a second section 18 angular to it closer to the fixed pin 12 end of the cylindrical member 4. The slot is of sufficient diameter to permit movement of the lever arm 14 along its length and rotationally to and from a position in which the pin 13 is locked in a retracted position when lever arm 14 is engaged in second section 18. A helical spring 19 is positioned in the hole in which pins 12 and 13 are positioned with the ends of spring 19 bearing respectively against the inner ends of the pins 12 and 13.

In using the unit, a reel with a fishing pole and line still attached is positioned with its rings on either end of and in alignment with pins 12 and 13 when pin 13 is retracted. Lever arm 14 is then released when the eyelets are aligned allowing pin 13 to move outwardly into engagement with one of the rings while the other pin 12 has already been engaged by one of the rings on the reel.

I claim:

1. A reel holder for securing a sport fishing reel having aligned eyelets integrally formed on the reel to the cabin roof of a sport fishing boat or the like comprising:

a cylindrical member having a flattened surface portion extending longitudinally of the axis thereof, said flattened surface portion being adapted to bear in flush relation against the interior of said cabin roof;

means forming holes extending transversely of said axis and through said portion adapted to receive securing means such as screws for securing said member to said roof;

a pair of pins longitudinally aligned with each other and with said cylindrical member on either end thereof;

means securing one pin to one end of said cylindrical member in fixed relation thereto;

means supporting the other pin at the other end of said cylindrical member for limited axial movement relative thereto; and spring means normally tensioning said second mentioned pin in a direction away from said cylindrical member whereby said pins may be removably interengaged with said eyelets of said reel by selective movement of said second mentioned pin.

2. A reel holder as set forth in claim 1 wherein said spring means comprises a helical spring positioned within said cylindrical member and having one end engaging said movable pin.

3. A reel holder as set forth in claim 2 having means for controlling the movement of said movable pin against the tension of said spring comprising:
- a lever arm secured at one end to said movable pin;
- means forming a slot extending longitudinally of and through a limited portion of said cylindrical member; and
- said lever arm extending through said slot and adapted to be engaged manually externally thereof.

4. A reel holder as set forth in claim 3 wherein said slot terminates at one end in a laterally extending segment adapted to engage and secure said lever arm.

5. A reel holder as set forth in claim 3 wherein said laterally extending segment of said slot extends toward said flattened surface portion of said cylindrical member.